Feb. 10, 1970        H. E. BADE        3,494,530

DEVICE FOR DRIVING IN NAILS, STAPLES OR THE LIKE

Filed Sept. 27, 1967        3 Sheets-Sheet 1

INVENTOR.
HEINZ EMIL BADE
BY
J.B. Felshin
attorney

Feb. 10, 1970            H. E. BADE           3,494,530

DEVICE FOR DRIVING IN NAILS, STAPLES OR THE LIKE

Filed Sept. 27, 1967          3 Sheets-Sheet 2

INVENTOR.
HEINZ EMIL BADE
BY J.B. Felshin
attorney

Feb. 10, 1970   H. E. BADE   3,494,530
DEVICE FOR DRIVING IN NAILS, STAPLES OR THE LIKE
Filed Sept. 27, 1967   3 Sheets-Sheet 3

INVENTOR.
HEINZ EMIL BADE
BY
J. B. Felshin
attorney

United States Patent Office 3,494,530
Patented Feb. 10, 1970

3,494,530
DEVICE FOR DRIVING IN NAILS, STAPLES OR THE LIKE
Heinz Emil Bade, Hamburg-Garstedt, Germany, assignor to Joh. Friedrich Behrens, Ahrensburg, Schleswig-Holstein, Germany, a partnership
Filed Sept. 27, 1967, Ser. No. 670,847
Claims priority, application Germany, July 12, 1967, B 93,449
Int. Cl. B27f 7/22
U.S. Cl. 227—8  12 Claims

ABSTRACT OF THE DISCLOSURE

A device for driving in nails, staples or the like fastener means, by means of a pressurized medium comprising a housing provided with a handle member and a holder for fastening means, and disposed beneath the housing. In the housing there is fixed a cylinder comprising upper and lower cylinder portions of different diameters. Within the cylinder is a piston having upper and lower fixedly interconnected piston disks slidable in said upper and lower cylinder portions, respectively. The cylinder is formed with an opening between said piston disks. A driving element is attached to the piston for driving fasteners from the holder. A diaphragm is fixed at its periphery in the housing and positioned above the upper cylinder and movable down against the upper end of the upper cylinder when the piston is below its uppermost inoperative position. The housing is provided with a head at its upper end disposed above the diaphragm. A separator disk in the housing and above the diaphragm and below said head forms a first space between the separator disk and the head, and a second space between the separator disk and the diaphragm. A control member is slidably centrally through the separator disk and is fixed centrally to the diaphragm. The control member has an annular rim adapted to seal against the underside of the head to form a control space. The control member is provided with a central passage to connect the control space with the space above the upper piston disk and below the diaphragm. The head is formed with an opening connecting the first space with the atmosphere. Workpiece sensing controlled means is provided to supply a pressurized medium to control space. Means is provided to continuously provide pressurized medium from the handle member to the interior of the cylinder and between the piston disks. Passage means is provided to connect the interior of the lower cylinder portion to the second space. A no-return valve controls said passage. Means is provided to vent the second space to the atmosphere. Means controlled by workpiece sensing means controls means to vent the space between the diaphragm and the separator disk. The upper piston disk has an annular rim adapted to connect the underside of the diaphragm and to raise the diaphragm and the control member and retain the control member in sealing engagement with the head.

BRIEF SUMMARY OF THE INVENTION

This invention relates to a device for driving in nails, staples or the like by means of a pressurized medium, which includes a housing accommodating driving elements and provided with a handle member and a holder receiving the fastening means and disposed beneath the housing, the pressure medium in the inoperative position of the device surrounding a cylinder in which a differential piston is movable upwardly and downwardly and a control element being provided which when being controlled permits the pressure medium to flow to an upper surface of the upper piston to be acted upon by the pressure medium.

Devices for driving in fastening means such as nails or staples are already known in which a working cylinder is surrounded by compressed air. The open top end of this cylinder is sealed from the compressed air surrounding the cylinder externally by means of a control element. This sealing control element which is in the form of a stepped piston can, in turn, be controlled by means of another control element and when being controlled, it permits the compressed air to pass freely from its upper surface to be acted upon by the compressed air through the said further control element to the atmosphere.

Further known are devices for driving in fastening means wherein a displaceable cylinder cooperates with an upper control element. The cylinder can be displaced in the driving direction by means of another control element, the upper control element closing an exhaust opening after the air has broken into the cylinder. In one of these known devices the piston is constructed as a flat-type crown piston which can be returned into its inoperative position by further control elements located beneath the piston. In other known driving apparatuses the return movement of the piston is effected by means of a spring.

The known devices for driving in fastening means have the disadvantage that the control of the piston requires an extremely large expenditure of apparatus and that prior to setting the piston in motion it is first necessary to build up above the upper surface of the piston to be acted upon by the pressure medium the pressure required for the driving operation. However, before the complete pressure has been built up, the piston begins to move in the driving direction which is, in turn, connected with an expansion of the compressed air. The working piston is thus practically not imparted the highest possible driving speed.

It is the object of the present invention to release the movement of the piston without control elements requiring a large expenditure of apparatus and to set the piston in motion at a considerable speed immediately at the beginning of the driving stroke in order to be finally able to drive in the fastening means with the highest possible speed. The device should be operable not only by compressed air but also by liquid pressure media.

This object is achieved according to the present invention by providing a device for driving in nails, staples or the like wherein the resulting space between two disk-like portions of the differential piston likewise in inoperative position is filled with pressure medium and in the inoperative position is urged by the medium against a sealing diaphragm by means of its naturally upwardly directed thrust of the internally loaded annular surface of the upper portion of the piston of larger diameter and wherein the differential pressure directed upwardly in the inoperative position can be cancelled by a pressrue impact on the upper surface of the upper portion of the piston to be acted upon by the pressure medium, whereby the piston is disengageable from the diaphragm and can be pushed in the driving direction by the full thrust exerted by the medium flowing from the space surrounding the cylinder and the annular space of the differential piston to the upper surface of the upper portion of the piston.

With this construction of the device, the cylinder is open in the normal position so that the compressed air around the upper free opening of the cylinder at the outer free annular portion of the piston is waiting to break into the cylinder. The piston is held against the diaphragm by means of the differential pressure obtained by the different diameters of the piston. The two diameters of the piston are dimensioned so that in the inoperative position, a sufficient counterpressure on the diaphragm is available to prevent the source pressure from passing to the blocked surface of the piston. Merely a pressure impact on the upper surface of the piston to be acted upon by the pressure medium is sufficient to cancel and reserve the above-described differential pressure on the piston so that the piston opens immediately without the opening characteristic of a valve. Thereby it is possible to obtain an optimum blow.

According to an expedient embodiment of the invention the sealing diaphragm clamped in the housing carries a control element which extends through the diaphragm and which connects the space situated above the upper surface of the upper portion of the piston with a control space which, in dependence on the position of the diaphragm, is closed in the inoperative position, communicates with the pressure source in the operative position and is open to the atmosphere during the return movement of the piston. As the exhaust is closed in the inoperative position, no pressure medium may be lost during the initiation of a driving operation, as is the case with the known devices.

According to a further development of the invention another control space is formed between the first control space and the diaphragm by means of a separating disk, which other control space communicates with the interior of the cylinder through a passage and a non-return valve to be opened only in the direction of admitting fluid to the passage and can be subjected to pressure through said passage for depressing the diaphragm onto the upper edge of the cylinder and thus for opening the first control space to the atmosphere when the interior of the piston which is constantly under pressure is brought into connection with the passage at the end of the driving stroke. The piston itself thus takes charge of the reversing function when the driving stroke is terminated in that it permits the pressure medium to flow to the upper surface of the diaphragm. In this manner the diaphragm lowers onto the open top edge of the cylinder, opens the exhaust and permits the piston to return into its inoperative position due to the difference in diameter. According to a still further development of the invention a connecting pipe is provided which serves to subject the first control space to pressure and to relieve the other control space of pressure and the interior of which opens the other control space to the atmosphere with a sensing tongue moved out of the supporting surface of the device, and to the control valve with the sensing tongue moved into the supporting surface. This construction of the control element is extremely simple and permits of easy operation because the connecting pipe has a low weight and is at the same time easily connectible to the sensing tongue.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

BRIEF DESCRIPTION OF THE SEVERAL VIEWS OF THE DRAWING

In the accompanying drawing, in which is shown an illustrative embodiment of this invention.

DETAILED DESCRIPTION OF THE INVENTION

Figure 1:
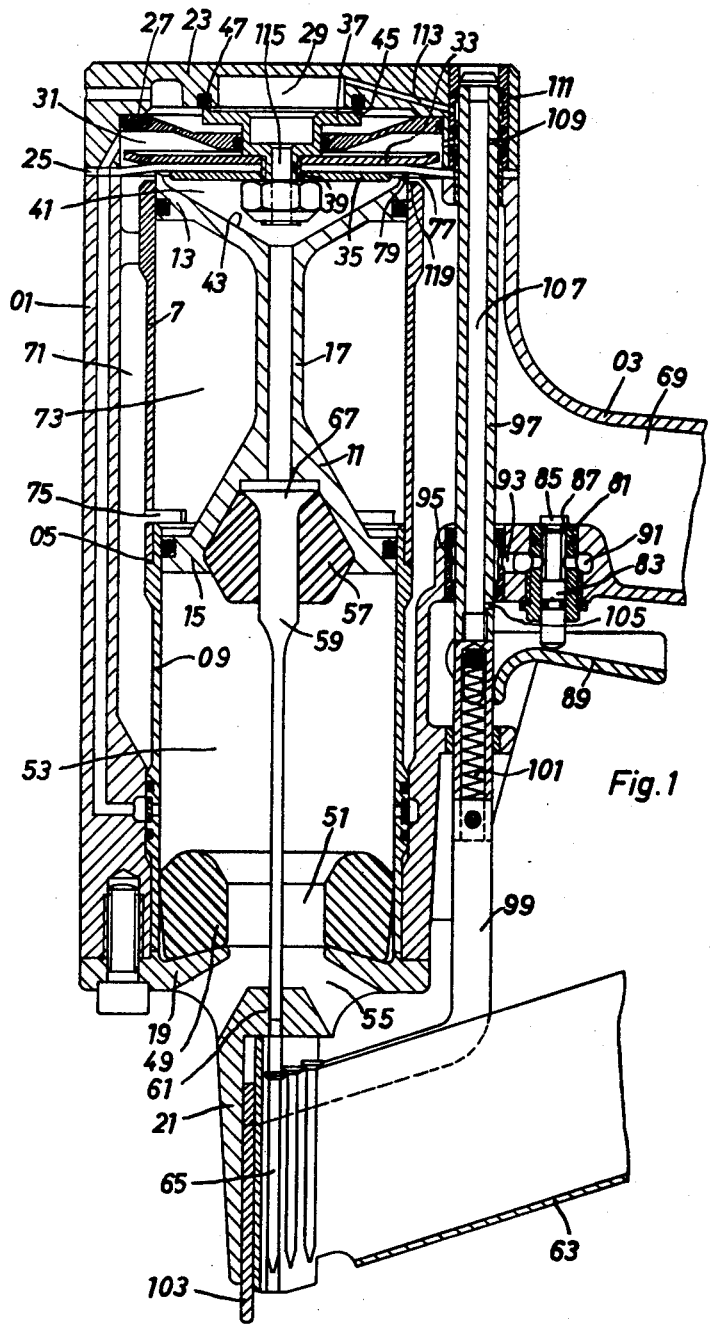
FIG. 1 is a vertical section through a device according to the invention shown in inoperative position.

With reference now to the drawings, a housing 01 having a handle 03 accommodates a cylinder 05 consisting of an upper section 7 of larger diameter and a lower section 09 of smaller diameter. Fitted into the two cylinder sections 7 and 9 is a stepped piston 11 which consists of an upper portion 13 of larger external diameter and a lower portion 15 of smaller external diameter. The two portions of the piston 11 are connected by a tubular connection 17.

The housing 01 is covered at its lower end by means of a cover 19 having a nail guiding member 21 flanged thereto.

A cover 23 at the upper end of the housing 01 is of hollow construction and connected to the housing 01 through the intermediary of an interposed diaphragm 25. Disposed within the cover 23 of the housing is a separating disk 27 which separates the hollow space of the cover into two control spaces 29 and 31. The diaphragm 25 is flanked on both sides by steel disks 33 and 35 and both disks 33 and 35 are urged against the diaphragm 25 by means of a control member 37. The control member 37 comprises a tubular member 39 which connects a hollow space 41 defined by an upper surface 43 of the upper portion 13 of the piston 11 to be acted upon by the pressure medium with the upper control space 29. The control member 37 is provided with a flange 45 adapted to bear against a sealing ring 47 of the cover 23.

At the lower end of the cylinder 05 a damping element 49 is inserted in the housing 01, which damping element has a central opening 51 and enables the air in a hollow space 53 situated beneath the lower portion 15 of the piston 11 to escape to the atmosphere through outlet passages 55.

Mounted in an elastic lining 57 of the piston 11 is a driving ram 59 which can be passed through a guide opening 61 to a nail or staple holder 63. The driving ram serves to separate individual nails 65 from the nails contained in the nail or staple holder 63 and to drive them into a workpiece. The lining 57 of the piston 11 is designed so that in the case of a driving operation and in the event of a sudden deceleration of the piston the forces due to gravity of the driving ram are fairly dampened. For this purpose the driving ram 59 is provided at a position above the lining 57 of the piston 11 with a headpiece 67 which will be supported in the lining 57 of the piston 11 at the end of a driving operation.

In the inoperative position of the device compressed air is contained in a hollow space 69 of the handle 3 and simultaneously fills a hollow space 71 extending around the cylinder 05 and an inner space 73 of the piston 11. The connection between the annular hollow space 71 and the inner space 73 is established by means of an opening 75. The compressed air in the inoperative position of the device acts on a freely exposed end face 77 of the diaphragm 25 and forces the diaphragm together with its control member 37 upwardly, thereby causing the flange 45 to bear against the sealing ring 47. The upper control space 29 of the cover 23 is thus sealed from the atmosphere. In addition to the compressed air an upper annular face 79 of the piston 11 acts upon the diaphragm 25 due to the differential pressure which is produced in the inner space 73 and which urges the stepped piston 11 upwardly.

For controlling the device as proposed by the invention, two partly independently operating control elements are provided. One of these control elements comprises a valve 81 which has a control stem 83 having an upper portion 85 which is enlarged in the form of a head and projects into the hollow space 69 of the handle 03. The air pressure in the hollow space 69 of the handle urges the control stem 83 against a sealing ring 87 so that in the inoperative position of the device the control valve is closed. For opening the control valve, a trigger arm 89 is lifted which urges the control stem 83 upwardly and thus permits compressed air to flow into an annular space 91 and a passage 93. This compressed air is first ineffective since it is prevented from continuing flowing from the passage 93. The passage 93 leads to an annular space 95 through which a connecting pipe 97 extends. This connecting pipe is connected to a sensing tongue 103 by means of a rod 99 which is urged downwardly by a pressure spring 101. When the device is placed on a workpiece, then the sensing tongue 103 slides into the nail guiding member 21. This causes a bore 105 in the connecting pipe 97 to be brought in place in the annular space 95, thereby permitting the compressed air to flow from the passage 93 through the annular space 95 into the interior 107 of the connecting pipe. Within the cover 23 another bore 109 is provided in the connecting pipe 97. Upon shifting the connecting pipe 97 upwardly the bore 109 passes into the region of another annular space 111 which communicates with the first control space 29 through a passage 113. The compressed air can thus flow through the upper control space 29 and a passage 115 in the control member 37 into the hollow space 41 and exert thrust on the upper surface 43 of the upper portion 13 of the piston 11. This thrust causes the upwardly directed differential pressure within the hollow space 73 of the piston 11 to be cancelled. The piston 11 thus disengages from the diaphragm 25 and moves in the driving direction. The air pressing against the annular surface 79 of the piston 11 at the upper end 119 of the cylinder 05 can then instantaneously break into the hollow space 41, whereby the piston is immediately pushed in the driving direction at optimum speed.

Figure 2:
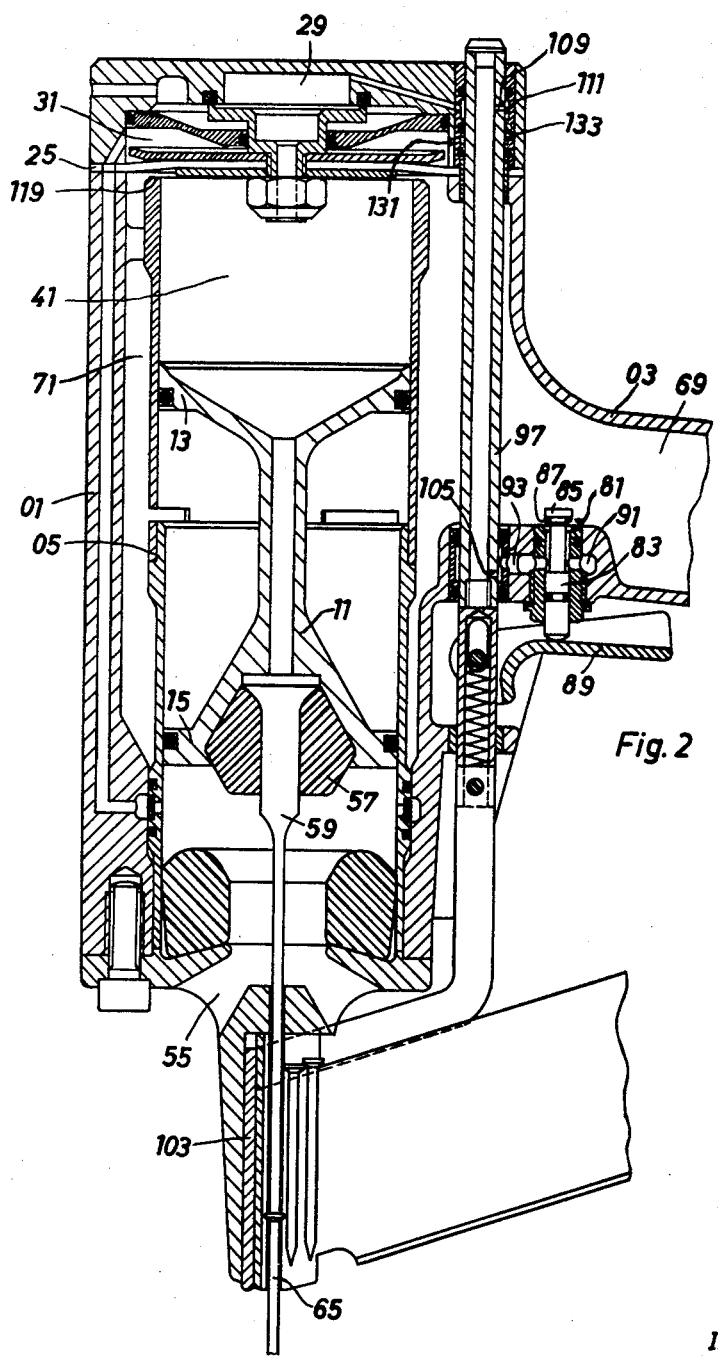
FIG. 2 is a vertical section through the device with the driving piston shown in downwardly moving condition.

FIG. 2 shows the corresponding positions of the connecting pipe 97 and the sensing tongue 103. The compressed air flowing through the gap between the diaphragm 25 and the upper end 119 of the cylinder 7 into the hollow space 41 forces the piston 11 downwardly, whereby the nail 65 can be driven into a workpiece.

Figure 3:
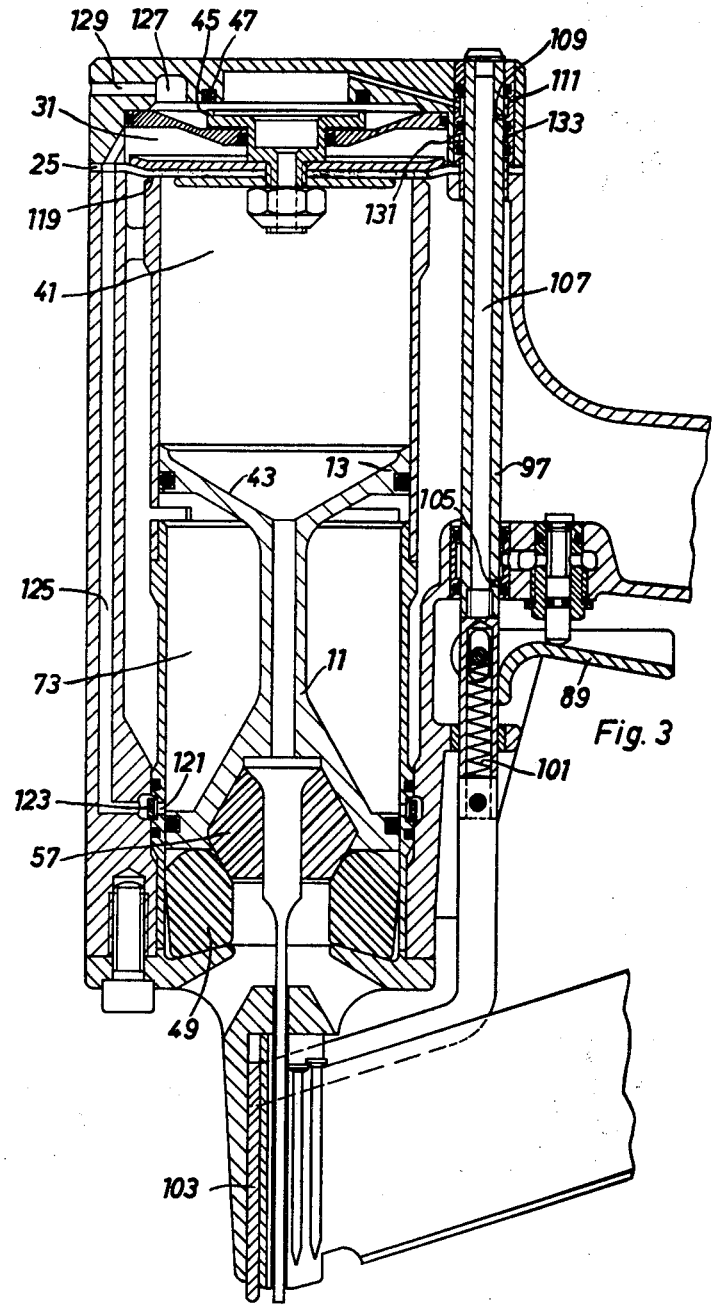
FIG. 3 is a vertical section through the device with the driving piston shown at the end of the drawing stroke.

As soon as the piston 11 has reached its lower end position (FIG. 3), the lining 57 of the piston 11 is decelerated at the damping element 49. In this lower end position of the piston the compressed air contained in the inner space 73 of the piston can flow through a bore 121 in the cylinder wall past a non-return valve 123 consisting of a rubber ring, into a passage 125. From this passage 125 it passes finally into the second control space 31 situated above the diaphragm 25. As a result of the pressure acting upon the upper surface of the diaphragm, the diaphragm 25 moves downwardly and engages the upper end 119 of the cylinder 7. The pressure in space 29, when control member 37 is in contact with seal 47, reduces the effective upwardly biased area of face 77 of diaphragm 25 by an amount to cause the diaphragm to move downwardly. Due to this downward movement of the diaphragm the flange 45 has disengaged from the sealing ring 47 and the hollow space 41 situated above the upper surface 43 of the upper portion 13 of the piston is open to the atmosphere through a hollow space 127 and a passage 129. This causes the differential pressure to become again effective on the portions of the piston 11 and the piston 11 to be moved upwardly in the direction towards its operative position. The diaphragm 25, however, continues to remain in its closing position even after the termination of the upward movement of the piston 11 because the pressure in the second control space 31 is maintained by the non-return valve 123.

It should be mentioned in this place that neither the trigger arm 89 nor the sensing tongue 103 have left their working position until the stepped piston 11 is returned to its initial position. The return of the trigger arm 89 is thus absolutely independent of the position of the trigger arm 89 and the sensing tongue 103. Only when the device is lifted off the workpiece is the sensing tongue 103 again lowered due to the action of the spring 101. The second control space 31 then communicates through a passage 131, an annular space 133 and the bore 109 with the interior 107 of the connecting pipe 97 which is open to the atmosphere through the bore 105. The pressure in the second control space 31 thus vanishes and the diaphragm 25 is again lifted so that the inoperative position according to FIG. 1 is obtained.

Even without releasing the trigger arm 89, placing the device once again on a workpiece and thus pushing the sensing tongue 103 once again into the nail guiding member would cause a new nail driving stroke. This involves the advantage that by shortly lifting and again lowering the device in rapid succession without releasing the trigger arm, the device is able to perform successive driving operations during which the device jumps across the workpiece. It is only necessary to lift the device off the workpiece and to place it again on the workpiece with its own weight before the next blow is done. It is, however, also possible to release the trigger arm each time and to place the device each time on the desired point of the workpiece. When the trigger arm is then again lifted a new nail is driven into the workpiece. By operating the trigger arm, the individual driving operations cannot be performed in such a rapid succession, but the driving operations can be kept under more accurate control.

It will thus be seen that there is provided an article in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. A device for driving nails, staples or the like fastening means by means of a pressurized medium, including a housing provided with a handle member and a holder for fastening means and disposed beneath said housing, a fixed cylinder in said housing, a differential double piston in said cylinder having upper and lower piston disks and movable upwardly and downwardly therein, said upper piston disk being of greater diameter than the lower piston disk, a driving element attached to said piston for driving fastening means from said holder, a sealing diaphragm in said housing and above said upper piston disk, means to feed pressurized medium from said handle to the inside of said cylinder and between said piston disks to retain said piston in an upper inoperative position and against said sealing diaphragm and control means to permit pressurized medium to simultaneously flow to the upper surface of the upper piston disk, to disengage the upper piston disk from the diaphragm and push the piston downwardly in the driving direction, said sealing diaphragm being clamped in said housing, a control element extending through said sealing diaphragm and fixed thereto and formed with a passage connecting a space located above the upper surface of the upper piston disk with a control space above said control element, which, in one position of the diaphragm and control element, is closed in the upper inoperative position of said piston, means controlled by said control means to connect said control space to pressurized medium in said handle, whereby said medium passes through said control space and passage to the upper side of the upper piston disk to lower said piston.

2. The combination of claim 1, a separating disk through which said control element passes, and located above said diaphragm and means to permit pressurized medium to pass from the inside of the cylinder and between said piston disks in the lower position of said differential double piston in said cylinder, to the space between said diaphragm and separator disk, to lower said diaphragm and control element, and means to open said control space to the atmosphere upon lowering said control element.

3. The combination of claim 2, said means to permit pressurized medium to pass from the inside of said cylinder to said space between said diaphragm and separator disk, comprising a non-return valve.

4. The combination of claim 3, and means to control supply of pressurized medium to said control space and to vent the space between said separator disk and diaphragm to the atmosphere.

5. The combination of claim 4, and workpiece sensing means to control said supply control means and vent means.

6. The combination of claim 5, and manually controlled means to shut off supply of pressurized medium to said control space when said workpiece sensing means is in position to allow passage of pressurized medium to said control space.

7. A device for driving nails, staples or the like fastening means by means of a pressurized medium, including a housing provided with a handle member and a holder for fastening means and disposed beneath said housing, a fixed cylinder in said housing, a differential double piston in said cylinder having upper and lower piston disks and movable upwardly and downwardly therein, said upper piston disk being of greater diameter than the lower piston disk, a driving element attached to said piston for driving fastening means from said holder, a sealing diaphragm in said housing and above said upper piston disk, means to feed pressurized medium from said handle to the inside of said cylinder and between said piston disks to retain said piston in an upper inoperative position and against said sealing diaphragm, and control means to permit pressurized medium to simultaneously flow to the upper surface of the upper piston disk, to disengage the upper piston disk from the diaphragm and push the piston downwardly in the driving direction, a head at the upper end of said housing, said control member having an annular rim adapted to sealingly engage the underside of said head, said annular rim of said control member being spaced away from and below the underside of said head when said diaphragm is in contact with the upper end of said cylinder, said upper piston having an upper annular rim adapted to contact the underside of said diaphragm to move and retain said diaphragm up above the upper end of said upper cylinder and retain said control member in sealing engagement with the underside of said head.

8. A device for driving-in nails, staples or the like fasteners by means of a pressurized medium, comprising a housing, upper and lower coaxial cylinders of different diameters fixed in said housing, a piston having upper and lower fixedly interconnected piston disks slidable in said upper and lower cylinders, respectively, said cylinders being formed with an opening between said piston disks, a driving element attached to said piston for driving fasteners, a diaphragm fixed at its periphery in said housing and positioned above said upper cylinder and movable down against the upper end of said upper cylinder when the piston is below its uppermost position, a head at the upper end of said housing and above said diaphragm, a separating disk in said housing above said diaphragm, and below said head forming a first space between said separator disk and head and a second space between said separator disk and diaphragm, a control member slidable centrally through said separating disk and fixed centrally to said diaphragm and having an annular rim adapted to seal against the underside of said head to form a third space therewith and having a central passage to connect said third space with space above said upper piston disk and below said diaphragm, said head being formed with an opening connecting said first space with the atmosphere, means to supply a pressurized medium to said third space and to said opening in said cylinders, passage means to connect the interior of the lower cylinder to said second space, one way valve means to permit pressurized medium to pass from the interior of the lower cylinder to said passage means to pass to said second space to lower the diaphragm and control member whereby to open said third space to said first space and atmosphere.

9. The combination of claim 8, said upper cylinder having a larger diameter than said lower cylinder.

10. The combination of claim 9, said means to supply pressurized medium comprising a member movably mounted on said housing, means to supply said medium to said third space in one position of said movable member, and means to vent air from said second space in another position of said movable member.

11. The combination of claim 10, means to normally retain said movable member in said another position, and means adapted to contact a workpiece, to move said member from said another position to said one position.

12. The combination of claim 10, and manually actuated valve means to shut off supply of medium to said third space when said movable member is in said one position thereof.

References Cited

UNITED STATES PATENTS

| | | | |
|---|---|---|---|
| 3,056,964 | 10/1962 | Beckman et al. | 227—8 |
| 3,106,136 | 10/1963 | Langas et al. | 227—130 XR |
| 3,351,256 | 11/1967 | Readyhough | 227—130 |
| 3,352,471 | 11/1967 | Fisher | 227—130 XR |

GRANVILLE Y. CUSTER, JR., Primary Examiner

U.S. Cl. X.R.

227—130